(12) United States Patent
Harrow et al.

(10) Patent No.: US 8,024,950 B2
(45) Date of Patent: Sep. 27, 2011

(54) VERTICAL AIR COMPLIANT HEMMING HEAD

(76) Inventors: Aaron E. Harrow, Lapeer, MI (US); Thomas A. Cox, Otterlake, MI (US)

( * ) Notice: Subject to any disclaimer, the term of this patent is extended or adjusted under 35 U.S.C. 154(b) by 429 days.

(21) Appl. No.: 12/321,698

(22) Filed: Jan. 23, 2009

(65) Prior Publication Data
US 2009/0217726 A1 Sep. 3, 2009

Related U.S. Application Data

(60) Provisional application No. 61/062,033, filed on Jan. 23, 2008.

(51) Int. Cl.
*B21D 39/02* (2006.01)
(52) U.S. Cl. ............................ 72/220; 72/214; 29/243.57
(58) Field of Classification Search ................... 72/10.4, 72/14.4, 210, 214, 220, 306, 312, 466.7, 72/466.8; 29/243.57, 243.58
See application file for complete search history.

(56) References Cited

U.S. PATENT DOCUMENTS

| | | | |
|---|---|---|---|
| 5,228,190 A * | 7/1993 | Sawa | 29/243.57 |
| 5,267,387 A | 12/1993 | Sawa | |
| 6,425,277 B2 | 7/2002 | Wiens | |
| 6,640,599 B1 * | 11/2003 | Persson | 72/210 |
| 6,694,793 B1 * | 2/2004 | Persson | 72/220 |
| 6,983,633 B2 | 1/2006 | Holmgren et al. | |
| 7,124,611 B2 * | 10/2006 | Baulier et al. | 72/220 |
| 7,152,447 B2 | 12/2006 | Toeniskoetter | |
| 7,254,973 B2 | 8/2007 | Campian | |
| 2005/0229666 A1 | 10/2005 | Toeniskoetter | |

* cited by examiner

*Primary Examiner* — David Jones
(74) *Attorney, Agent, or Firm* — The Weintraub Group, P.L.C.

(57) ABSTRACT

A hemming apparatus is provided for use with a robot in performing a hemming operation. The hemming apparatus comprises a support housing which mounts to a machine and has a pressurizable interior chamber having forward and rearward portions. A slide member includes a piston which is disposed in the chamber, and a plunger extends outwardly from the piston. Means are provided for attaching the housing to a nose having a central passageway. A bearing shaft is disposed within the central passageway, and means are provided for connecting the bearing shaft to the plunger. A hem roller is attached at the end of the bearing shaft. The rearward and forward portions of the chamber are connectible to a source of fluid pressure such that adjusting the chamber pressures moves the piston, thereby causing the bearing shaft to drive the hem roller into engagement with a work piece.

14 Claims, 4 Drawing Sheets

VERTICAL AIR COMPLIANT HEMMING HEAD

CROSS REFERENCE TO RELATED APPLICATION

This application claims the benefit of U.S. Provisional Application 61/062,033, which was filed on Jan. 23, 2008, the entire disclosure of which is hereby incorporated by reference.

BACKGROUND OF THE INVENTION

1. Field of the Invention

This invention relates to hemming sheet metal and more particularly to a hemming apparatus and method for forming a generally flat hem between two metal panels. Even more particularly, this invention relates to a roller-type hemming apparatus for edge hemming vehicle closure panels, such as hemming door, hood, trunk, and deck lid panels.

2. Description of the Prior Art

In the automotive industry, hemming machines are conventionally used to attach two metal panels together. These metal panels include, for example, the metal panels to form the automotive hood, door panels, quarter panels, and the like.

Hemming machines are disclosed in the patent prior art, including U.S. Pat. No. 5,267,387, issued Dec. 7, 1993 to Sawa; U.S. Pat. No. 6,425,277, issued Jul. 30, 2002 to Wiens; U.S. Pat. No. 6,983,633, issued Jan. 10, 2006 to Holmgren et al.; and U.S. Pat. No. 7,152,447, issued Dec. 26, 2006 to Toeniskoetter; and U.S. Patent Publication No. 2005/0229666, published Oct. 20, 2005 to Toeniskoetter.

A conventional roller hemming apparatus is mounted to a multi-axis controllable robot and may include a hem roller carried by a support. The roller hemming apparatus is adapted for hemming a bent portion of a workpiece, such as a door panel, which is positioned on a hemming die. The workpiece is hemmed by rolling the hem roller, under pressure, along the bent portion. The conventional roller-type hemming apparatus is used for continuous hemming along the contour edge of the workpiece.

In order to achieve good hemming with a conventional hemming apparatus, the robot must move the hem roller along the edge of the workpiece at a constant distance from the hemming die. However, a robot is not comprised of a perfectly rigid body. Therefore, when the hem roller is positioned against the edge of the workpiece, the robot may be deflected by its own resiliency or by a resistive force exerted by the edge of the workpiece itself. This results in a fluctuation of the pressing force applied by the hem roller onto the edge of the workpiece, and therefore imperfect hemming of the workpiece.

Various approaches to compensate for fluctuating pressing force have been proposed. For example, springs have been used. However it has been observed that springs alone have proven to be inadequate.

In addition, traditional hemming rollers having a single roller only enable the user to hem simplistic workpiece such as those having open areas. However single roller hemming apparatuses are not capable of hemming a workpiece with complex configurations.

Additionally, certain workpieces having complex geometry may be difficult to hem. It is costly to reconfigure robot-controlled hemming apparatuses because it is time consuming with respect to labor expenses. In addition, customized tooling required to reconfigure the mounting of the robot is expensive. To overcome this problem, some roller hemming apparatuses provide two rollers on a common spindle. The first roller is used for the actual hemming, while the second roller is used to guide the first roller relative to the workpiece.

Additionally, as work progresses, oftentimes the circumference of the hemming roller may become nicked, thus resulting in an imperfect hemming.

SUMMARY OF THE INVENTION

The present invention provides a roller-type hemming apparatus which includes a hemming head. Attached to the hemming head is a hem roller that can accurately follow the configuration of a bent portion of a workpiece to be hemmed. The present invention can more accurately and consistently apply a constant hemming force to the workpiece.

The present invention also provides a roller-type hemming head wherein deflection of the hem roller is limited to a settable range limited by an adjustable pressure applied to a slidable guide member that supports the hem roller. The hemming head is air compliant in that the pressure on the hemming roller is the result of a cushion of fluid (air or oil) acting on a piston shaft to maintain the roller in contact with the metal being hemmed.

Further, according to this invention, the hemming head is replaceable attached to the end of a robot arm of a conventional robotic system. The hemming head is configured to be rapidly removed from the robot arm. The hemming head includes a spindle upon which two or more hemming rollers of different diameter may be attached, so as to enable hemming in complicated and hard-to-reach areas. The position of each hemming roller is adapted to be reversed relative to the spindle so that the outer circumference on each side of the roller is capable of use.

According to this invention, there is provided a roller-type hemming apparatus, comprising:

a housing having rearward and forward ends and a pressurizable chamber, a slide member including a piston in said chamber and a plunger projecting forwardly of the forward end of said housing and terminating in an interlockable first connector, said piston dividing said chamber into rearward and forward chamber portions, each of said chamber portions being connectible to a source of pressure for selectively pressurizing each said chamber portion so as to move said piston relative to said chamber;

a nose having rearward and forward ends and a central guide passage extending between said ends of said nose, a bearing shaft mounted for sliding movement in said guide passage, said bearing shaft including rearward and forward ends that form an interlockable second connector adapted to connect said first connector with a head portion;

a spindle cartridge, said cartridge being removably mountable to said head portion and including a rotatably mounted spindle shaft having opposite ends, each of said spindle shaft ends adapted to receive and mount a hem roller thereto for rigid body rotation with said spindle shaft;

first means for releasably mounting said rearward end of said housing to a robot; and second means for releasably mounting said rearward end of said nose to said forward end of said housing.

According to another embodiment of this invention, there is provided a roller-type hemming apparatus, comprising:

a support member having a slide bore and an interior chamber;

a closure plate having a guide bore therethrough, said closure plate being mounted in sealing relation to said support member, allowing said interior chamber to be pressurized, and said guide bore being in fluid communication with said chamber;

a slide member including a piston and an axially elongated plunger extending therefrom and terminating in a connectible end, said piston mounted in said pressurizable chamber for axial slidable movement relative to said bore and said plunger extending through said guide bore for axial slidable movement relative thereto, said piston separating said interior chamber into forward and rearward chamber portions with each said chamber portion being adapted to be placed in fluid communication with a pressure source for selectively adjusting the pressure in each of said chamber portions and the force applied against opposite sides of said piston wherein to force said piston towards and away from one side of said closure plate and the connectible end of the plunger away and towards said other side of said closure plate, means for sealing the interface between said plunger and said guide bore;

a roller hemming assembly, said roller assembly including a hem roller which is adapted to engage a workpiece; and means for connecting said roller hemming assembly to said plunger;

wherein adjusting the pressure in said respective chamber portions causes said plunger to force said hem roller into engagement with said workpiece.

According to this embodiment, the plunger is a two-part assembly comprised of a piston shaft and a quick-connect shaft, the assembly is coaxially disposed and extends outwardly from the forward side of the piston. The piston shaft and quick-connect shaft are threadably connected to each other at their respective ends. The piston shaft has a rearward end connected to the piston and the connectible end is formed by the forward end portion of the quick connect shaft.

In some applications, the plunger may be a single-piece assembly.

The roller hemming assembly includes a spindle cartridge having a spindle shaft with opposite ends. The spindle shaft is rotatably mounted to the spindle cartridge. At least one hem roller is rotatably secured to the spindle shaft.

Preferably, a hem roller is secured to each end of the shaft and one hem roller has a diameter greater than the other. The hem rollers are adapted to engage and hem the workpiece at various angles depending on the orientation of the spindle shaft.

According to this embodiment, the means for connecting the roller hemming assembly to the plunger comprises a quick connect/disconnect to allow interchangeability or repair when needed. In particular, the means for connecting comprises an axial bearing shaft having forward and rearward end portions, the forward end portion including means for removably mounting the roller hemming assembly. Further, the rearward end portion of the bearing shaft and the connectible forward end portion of the connectible shaft have complementary male and female portions which are adapted to interlock with one another wherein to connect the respective shafts end portions together.

Further, the hemming apparatus includes a shaped nose having a rearward end that is connected to the other side of the closure plate, a forward end, and a central passage. The central passage extends between the rearward and forward ends to enclose the interconnected shafts. The central passage has a square cross section, which is complementary to the bearing shaft.

The forward end of the bearing shaft is positioned outwardly of the nose and the spindle cartridge is positioned forwardly of the nose.

In one application, the bearing shaft has a square cross section and the rearward end portion thereof which is hollowed out to provide a generally cylindrical T-shaped cavity centered along the axis of the bearing shaft. The rearward end face of the nose is formed to include a U-shaped cavity that extends transversely of the central passage, and the forward end portion of the quick-connect shaft (or plunger if one-piece) is T-shaped.

In practice, the rearward end face of the nose is positioned in an off-centered relation with the quick-connect shaft. The nose is lowered onto the closure plate, and the T-shaped end portion of the quick-connect shaft is centered over and positioned into the U-shaped cavity of the nose. The nose is then moved laterally so that the T-shaped end portion is moved into the hollowed out T-shaped cavity of the bearing shaft. The nose is fixedly attached to the closure plate and the shafts are thus interconnected for axially guided movement.

In a particular application, the hemming apparatus is assembled to be in operable connection with a work-arm of a multi-axis robot, and in particular, to a hand at the forward end of the robot's work arm.

According to another aspect of this invention, the hem rollers are adapted to be connected to the spindle in a manner that the outer circumference engages the workpiece and each roller may be rotated 180° in a manner that the outer circumference becomes the inner circumference.

Further and according to another embodiment of this invention there is provided a hemming apparatus for use with a robot in performing a hemming operation on a pair of metal panels, the hemming apparatus comprising:

a support housing having a rearward base for mounting said housing to a machine, a forward closure plate having a central guide bore, and a pressurizible interior chamber;

a slide member including a piston disposed in said chamber and a plunger extending from said piston and through said guide bore to a connectible end spaced from said closure plate;

a nose removably secured to said closure plate;

a bearing shaft having forward and rearward end portions;

means for connecting said rearward end of said bearing shaft to said connectible end of said plunger;

a spindle cartridge having a spindle shaft, said spindle shaft having opposite ends mounted for rotation relative to said spindle cartridge, and a hem roller attached to each end of said spindle shaft for rotation therewith, each hem roller having a particular task in performing the hemming operation;

means for connecting said spindle cartridge to said forward end portion of said bearing shaft; and said piston dividing said chamber into rearward and forward portions, said rearward and forward portions being connectible to a source of fluid pressure, whereby adjusting the pressure forces the piston to move either forwardly or rearwardly, causing said bearing shaft to drive said hem roller into engagement with a work piece.

In practice of this embodiment of the invention, the hemming apparatus is in operable relation with a fluid control apparatus which maintains control of the chamber pressure. The fluid control apparatus is preferably in synchronized operable control by a control system which directs the robotic arm to complete the hemming operation.

Preferably the fluid is air, although in some applications the fluid may by oil or other suitable liquid medium.

An array of threaded boltholes are provided in the closure plate. A corresponding array of boltholes is provided in the nose thus enabling the nose, and, in turn the hem rollers, to be indexed or angularly positioned relative to one another and to the center axis of the hemming head. This provides flexibility in rapidly changing the orientation of the spindle cartridge and hem rollers relative to the workpiece.

In yet another embodiment according to this invention there is provided a method of hemming a pair of metal panels using a robot, the steps including:

providing a housing, a nose, and a spindle cartridge, said housing having a pressurizable chamber and a slide member, said slide member including a piston in said chamber and a plunger projecting forwardly of a forward end of said housing and terminating in an interlockable first connector, said piston dividing said chamber into rearward and forward chamber portions, each said chamber portion being connectible to a source of pressure for selectively pressurizing said chamber portions to move said piston relative to said chamber, and said plunger relative to said forward end of said housing, said nose including a central guide passage extending therebetween and a bearing shaft mounted for sliding movement in said guide passage, said bearing shaft including a rearward end that forms an interlockable second connector adapted to connect with said first connector that forms a head portion, and the spindle cartridge including a rotatably mounted spindle shaft having opposite ends each adapted to receive and mount a hem roller thereto for rigid body rotation with said spindle shaft;

mounting said rearward end of said housing to said robot;

interconnecting said interlockable first and second portions;

mounting said rearward end of said nose to the forward end of said housing;

mounting said spindle cartridge to said head and said hem roller to said spindle shaft; whereby said chamber portions are in condition for being pressurized and said hem roller placed in operable hemming engagement with said metal panels.

For a more complete understanding of the present invention, reference is made to the following detailed description and accompanying drawings. In the drawings, like reference characters refer to like parts throughout the several views, in which:

DETAILED DESCRIPTION OF THE INVENTION

Figure 1:
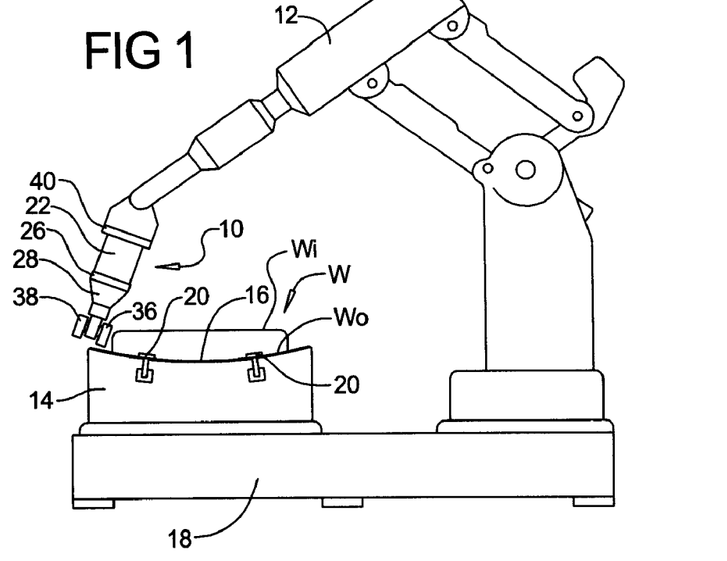
FIG. 1 is an environmental view of a roller-type hemming machine having a robot hand with a roller-type hemming head mounted thereto in accordance with the present invention.

Referring now to the drawings, and in particular to FIG. 1, there is shown an environmental view of a hemming operation wherein a roller type hemming apparatus 10, in accordance with the present invention, is operably connected to a work arm, such as a multi-axis controllable robot hand 12. The robot hand 12 forms the movable portion of a robot machine. The hemming apparatus 10 is constrained for movement along a predetermined traveling path relative to a workpiece W.

The work piece W is, for example, an automotive door panel comprised of an outer panel $W_o$ and an inner panel $W_i$. The outer panel $W_o$ has a peripheral portion preliminarily bent upwardly substantially at right angles, and the inner panel $W_i$ has a peripheral stepped portion extending outwardly. The outer panel $W_o$ and the inner panel $W_i$ are placed on a lower die 14 with the stepped portion of the inner panel $W_i$ arranged along the inside of the bent peripheral portion of the outer panel $W_o$.

The lower die 14 and the robot machine are both positioned on a common base 18. The lower die 14 has an upper surface constituting a forming surface 16. The hemming apparatus 10 is positioned at a predetermined distance away from the lower die 14. The workpiece W is placed on the forming surface 16 of the lower die 14 and is secured thereto by fixtures 20.

The above arrangement for hemming a pair of panels is conventional and described herein to provide background for the hemming apparatus 10 according to the present invention. Further, the robot machine, including the robot hand 12, is also well known in the art.

Figure 2:
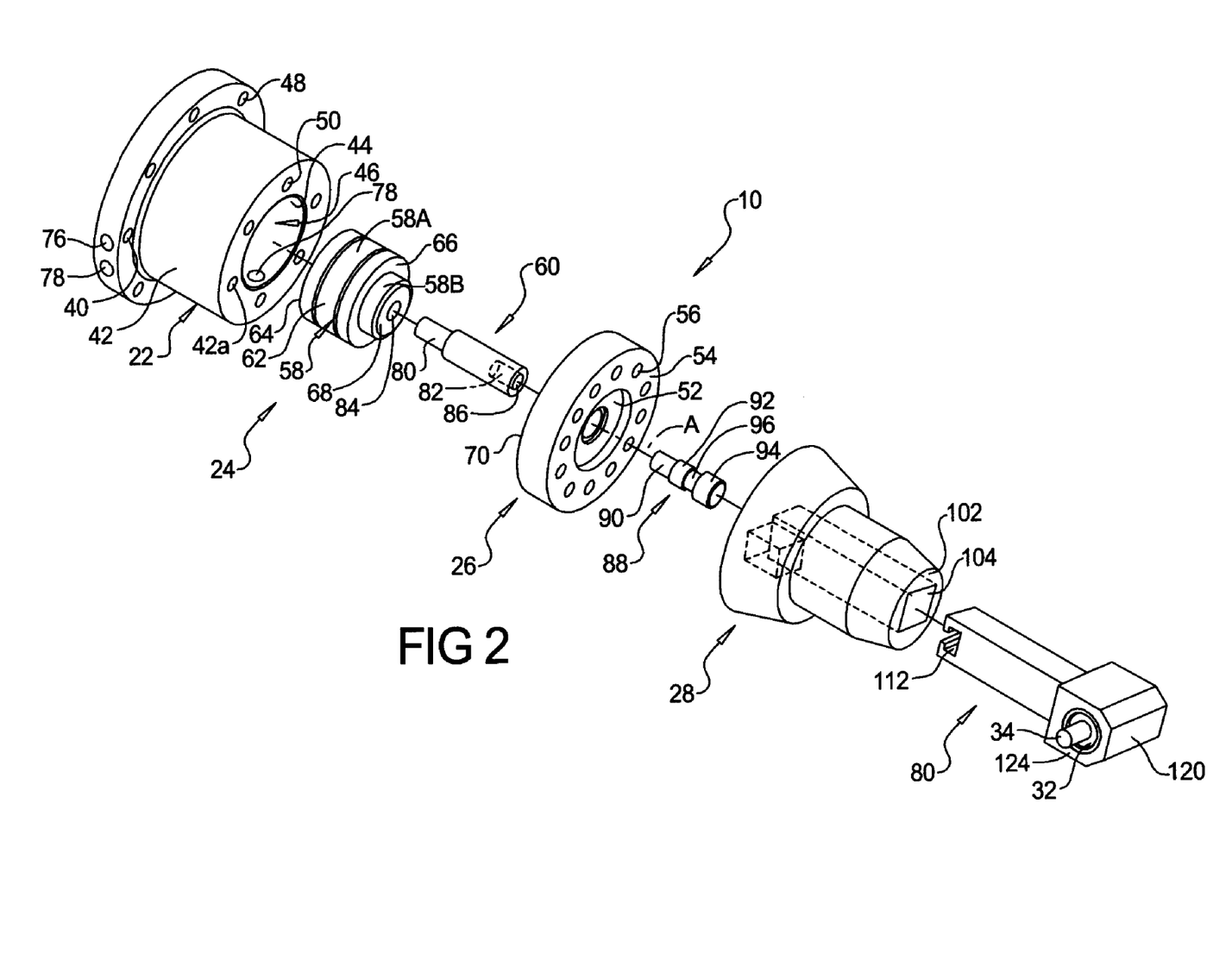
FIG. 2 is an exploded assembly view of the roller-type hemming head shown in FIG. 1 as seen looking rearwardly from the forward end.

Referring to FIG. 2, the hemming apparatus 10, according to this invention, is shown in exploded assembly. The hemming apparatus 10 includes: a support housing 22 that is mountable to the robot hand 12; a slide member 24 that is mounted in the support housing 22; a closure plate 26 that connects to the support housing 22 and captivates the slide member 24; a shaped nose 28 that is connectable to the closure plate 26; a bearing shaft 30 that is slidably disposed in the nose 28 connectible to the slide member 24 and a spindle cartridge 32 mounted to the bearing shaft 30, the cartridge 32 including a spindle shaft 34 journaled for rotation.

As shown in FIG. 1 and according to this invention, two hem rollers 36 and 38 are mounted to the spindle shaft 34 for rigid body rotation therewith. The hem rollers 36 and 38 are preferably of a different diameter and each of the hem rollers 36 and 38 are used for performing a different hemming operation from each other on a workpiece W.

As shown in FIG. 2, the support housing 22 is cup-shaped and includes a base member 40 and a cylindrical wall 42 that extends coaxially forwardly from the base member 40 to terminate in a forward end face 42a and form a cylindrical slide bore 44 and an interior chamber 46. The base member 40 includes an array of equiangularly-spaced through holes 48 for receiving bolts to mount the support housing 22 to the robot hand 12. In addition, the forward end face 42a includes an array of six equiangularly-spaced threaded boltholes 50.

The closure plate 26 is generally circular and disc-shaped and has a cylindrical guide bore 52 in the center thereof. The closure plate 26 also includes an array of countersunk through boltholes 56 and an array of threaded countersunk boltholes 54 disposed about an outer annular portion of the closure plate 26. As shown, each array of holes 54 and 56 are comprised of six equiangularly-spaced holes. The twelve boltholes disposed about the outer annular portion of the closure plate 26 are equiangularly-spaced with respect to each other around the circumference, and the holes of the respective arrays 54 and 56 alternate with one another.

Figure 3:
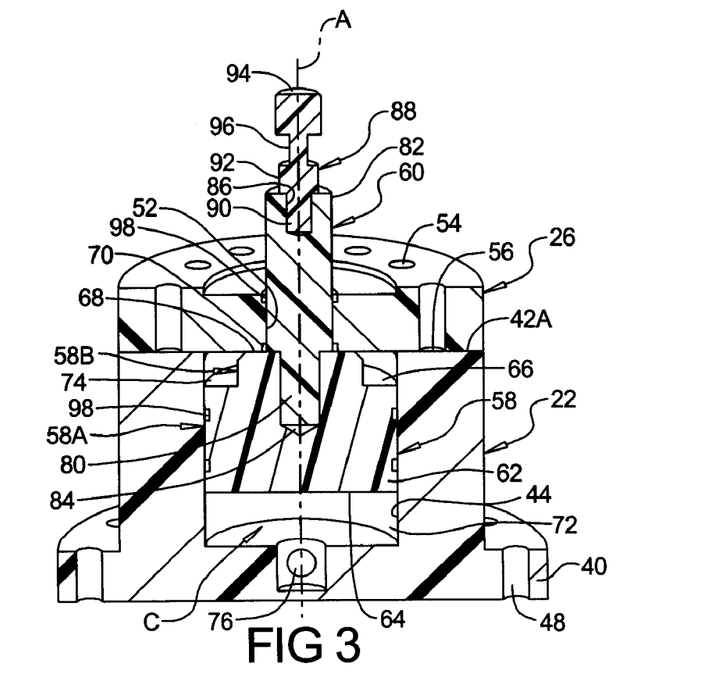
FIG. 3 is a side elevation section view of an assembly of a cup-shaped support housing and closure plate that form a chamber, a piston disposed in the chamber, and a two-part plunger that extends from the piston through the closure plate and comprised of a piston shaft and quick-connect shaft.

The closure plate 26 is mounted in fluid sealing relation to the forward end face 42a of the support housing 22 to form a closed pressurizable chamber "C" (as shown in FIG. 3). Referring back to FIG. 2, the array of through boltholes 56 in the closure plate 24 is aligned with the array of threaded boltholes 50 in the forward end face 42a of the support housing 22. Matching bolts are provided to secure the closure plate 26 to the forward end face 42a and atop the support housing 22.

The slide member 24 is mounted in the pressurizable chamber "C" for axial slidable movement relative to the slide bore 44. The slide member 24 includes a piston 58 and an elongated generally cylindrical piston shaft 60. The piston 58 is stepped and includes generally cylindrical rearward and forward piston portions, 58A and 58B, respectively, disposed on a central axis "A" corresponding to the central axis of the slide bore 44. The rearward piston portion 58A has an outer circumferential wall 62 that is generally complementary to the slide bore 44. The slide member 24 has oppositely facing rearward and forward end faces, 64 and 66, respectively. The forward piston portion 58B extends generally coaxially from the forward end face 66 of the rearward piston portion 58A and has a forward end face 68 that nests within a complementary recess 70 formed in the rearward side of the closure plate 26. In this regard the recess 70 helps to form a fluid cushion between the piston 58 and the closure plate 26 as well as a stop to limit the forward movement of the piston 58.

The piston 58 is mounted in the slide bore 44 for axial slidable movement, and separates the pressurizable interior chamber "C" into rearward and forward chamber portions, 72 and 74, respectively (see FIG. 3). Each chamber portion, 72 and 74, is adapted to be placed in fluid communication with a pressure source (not shown) to selectively increase the pressure in one of the chamber portions while decreasing the pressure in the other chamber portion. The differential in pressure applies a force against the opposite end faces, 64 and 66, of the piston 58, forcing the piston 58 either towards or away from the closure plate 26.

Figure 6:
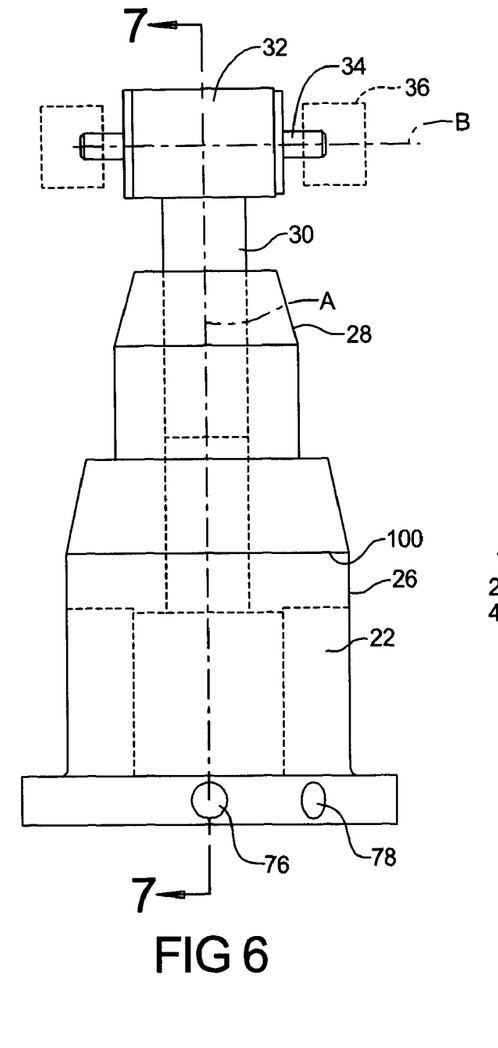
FIG. 6 is an elevation view of the hemming head according to the present invention.

In this regard, and as shown in FIGS. 2 and 6, first and second pressure lines, 76 and 78, respectively, are provided in the support housing 22 to supply pressure to one and the other of the respective chamber portions 72 and 74. The first pressure line 76 (see FIG. 3) extends radially and axially through the base member 40 and into the rearward chamber portion 72 formed between the base member and the rearward end face 64 of the rearward piston portion 58A.

The second pressure line 78 (see FIG. 2) extends radially through the base member 40 and axially and radially through the wall 42 of the support housing 22 into the forward chamber portion 74 formed between the forward end face 68 of the forward piston portion 58B and the rearward (interiorly facing) recess side of the closure plate 26.

The piston shaft 60 is axially elongated and extends from the center of the forward end face 68 of the forward piston portion 58B and through the guide bore 52 of the closure plate 26 for axial slidable movement relative thereto. The piston shaft 60 is coaxially aligned with the piston axis "A" and has rearward and forward end portions, 80 and 82, respectively. The rearward end portion 80 of the piston shaft 60 is externally threaded to enable threadable connection to a threaded socket 84 provided in the forward end face 68 of the forward piston portion 58B. The forward end portion 82 is provided with a threaded socket 86 to enable connection with a quick-connect shaft 88.

The quick-connect shaft 88 is generally stepped, cylindrical, and includes a threaded rearward end portion 90 that is connectible to the threaded socket 86. The quick-connect shaft 88 has a medial cylinder member 92 that abuts the socket 86 to accurately position the forward end of the quick-connect shaft relative to the piston shaft 60. The quick-connect shaft also has a forward cylinder member 94 and a cylindrical neck portion 96 of reduced diameter that extends between the cylinder members 92 and 94. The neck portion 96 and forward cylinder member 94 form a male section, which is T-shaped in cross-section and is used in a manner described herein below to form a quick connection with the bearing shaft 30.

The quick-connect shaft 88 allows for a quick connect/disconnect with the bearing shaft 30 to allow interchangeability or repair when needed.

Although the slide member 22 is described as having piston shaft 60 and a quick-connect shaft 88, separately provided and assembled, in some applications the two shafts 60 and 88 could be provided as a single-piece construction to form a common plunger member.

FIG. 3 illustrates the assembly of the support housing 22, the piston 58, the closure plate 26, and the plunger (as formed by the piston shaft 60 and the quick connect shaft 88).

In the assembly, a fluid seal 98, such as a gasket, O-ring, or the like, is provided to form an air tight fluid seal between the piston shaft 60 and the guide bore 52 so that the rearward chamber portion 74 may be pressurized.

Figures 4, 5:
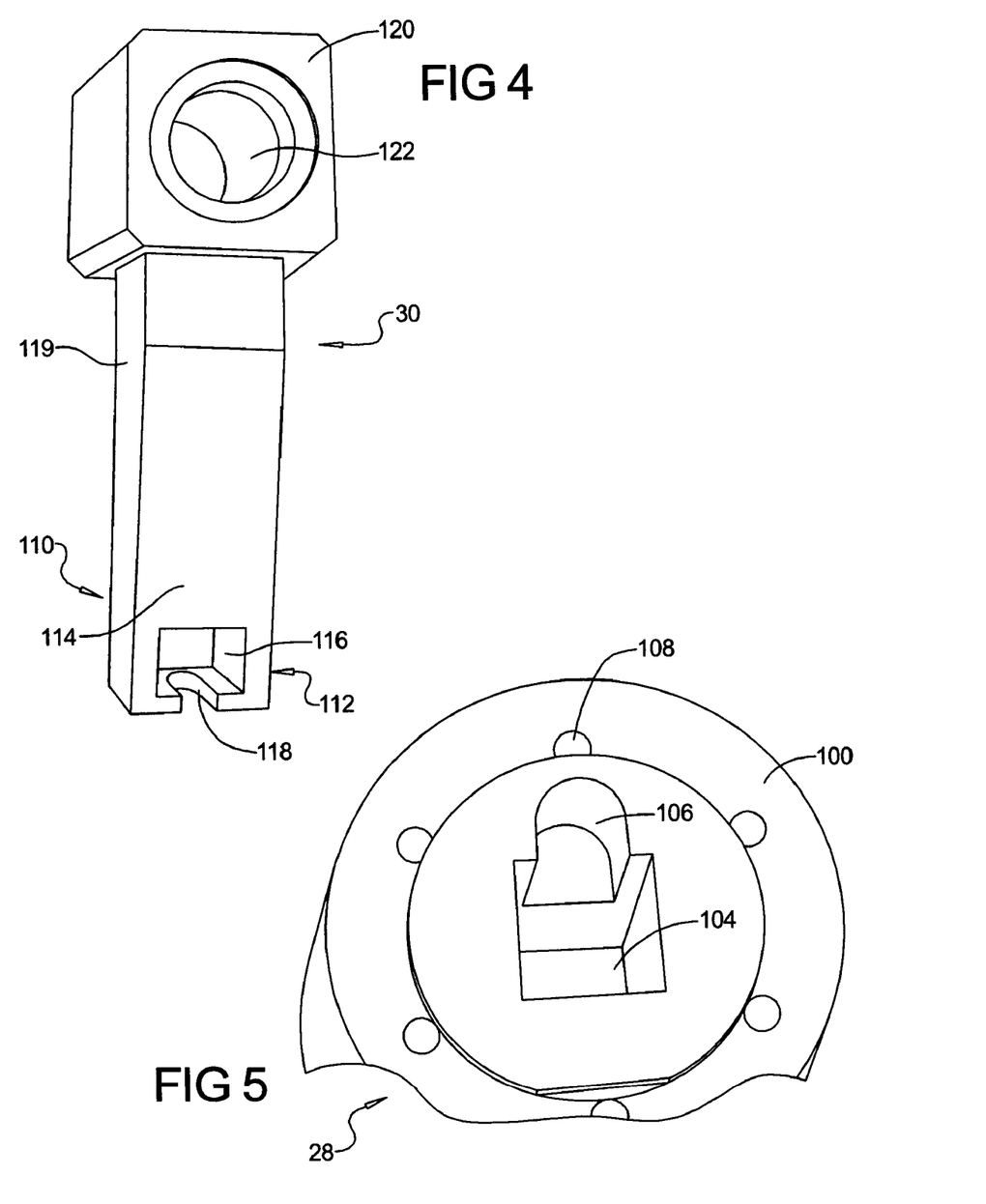
FIG. 4 is an enlarged perspective view of a bearing shaft and a T-shaped recess therein for connection to the forward end of the quick connect shaft of FIG. 3.
FIG. 5 is an enlarged perspective view of the rearward end of a nose of the hemming apparatus showing detail of a central passage for guidingly receiving the bearing shaft of FIG. 4 and a U-shaped recess for receiving the forward end of the quick connect shaft of FIG. 3.

The outer geometry of the shaped nose 28 is symmetrical about the central axis "A" and includes a rearward end 100 that is connectible to the closure plate 26, a forward end 102, and a central passage 104 that extends between the opposite ends 100 and 102. The central passage 104 has a generally square shaped cross-section and is adapted to guide and support the bearing shaft 30 and, at least in part, receive and enclose the interconnection between the plunger assembly of the piston shaft 60 and the quick connect shaft 88. As shown in FIG. 5, the rearward end 100 of the shaped nose 28 is formed to include a U-shaped cavity 106 that extends transversely from the central passage 104.

An array of countersunk boltholes 108 extend through the body of the nose 28. The boltholes 108 are equiangularly positioned and aligned with the array of threaded boltholes 54 in the closure plate 26 to receive threaded fasteners for connecting the nose 28 to the closure plate 26. Desirably, the set of threaded boltholes 54 in the closure plate 26 enable the nose 28 as well as the bearing shaft 30, to be positioned angularly without significant changes to the robotic system. Thus the position of the roller spindle cartridge 32 may be angularly indexed or rotated relative to the robot hand of the hemming apparatus.

The bearing shaft 30 has a generally square shaped cross-section complementary to the cross-section of the central passage 104 to form a close guiding fitment therewith, and has a central geometric axis that aligns with the axis "A" when disposed in the passage 104. To increase sliding guided movement relative to the central passage 104, the outer surface of the bearing shaft 30 may be coated with a lubricant.

As shown in FIG. 4, the bearing shaft 30 has a rearward end portion 110 which is hollowed out to provide a generally cylindrical T-shaped cavity 112, which is at least in part, centered along the axis "A" of the bearing shaft 30. The cavity 112 opens outwardly on an open face 114 of the shaft 30 and includes an enlarged interior chamber 116 and a reduced diameter neck portion 118 that forms an axial passage between the rearward end 110 of the shaft 30 and the chamber 116.

The bearing shaft 30 is dimensioned such that when the bearing shaft 30 is seated within the central passage 104 of the nose 28, the forward end 119 thereof extends outwardly past the forward end 102 of the nose 28 and terminates in an enlarged head 120. The head 120 is formed with a cylindrical socket 122 for receiving and mounting the spindle cartridge 32 therein.

The spindle cartridge 32 is in the form of a cylindrical casing that has a cylindrical mounting flange 124 provided with an array of boltholes that align with threaded mounting holes provided in the head 120. The casing is inserted into the socket 122 of the bearing shaft 30 and removably mounted thereto by threaded fasteners.

The spindle shaft 34 of the spindle cartridge 32 has opposite ends and is rotatably mounted within the spindle cartridge 32. The spindle axis of rotation "B" is generally at a right angle to the axis "A," such as shown in FIG. 6.

As shown best in FIGS. 1 and 6, hem rollers of varying sizes, 36 and 38, respectively, are removably secured to the end of the spindle shaft 34 for rigid body rotation therewith. Each hem roller, 36 and 38, is adapted to hem the workpiece W, depending on the orientation of the spindle shaft 34, as well as which roller, 36 or 38, is engaged with the workpiece W. The rollers, 36 and 38, are in the form of cylindrical discs and each is connected to the spindle shaft 34 in a manner that the outer circumference of the roller will engage the workpiece panels being hemmed. Further, each roller, 36 and 38, may be rotated 180° about the axis "A" so that the outer circumference becomes the inner circumference and vice versa.

In the embodiment illustrated, the roller 36 has a diameter that is greater than the diameter of the roller 38, and each roller is adapted to perform a different specified task of the hemming operation. This arrangement enables the robot hand 12, to which the hemming apparatus 10 is attached, to rotate the hemming apparatus 1800 about the axis "A" and place either the smaller or larger diameter roller in position for use, thereby enabling hemming operations in complicated or hard to reach areas to be accomplished.

In a particular application, the hemming apparatus, so assembled, is adapted for operable connection to a work-arm of a multi-axis robot, and in particular, to a hand at the forward end of the work arm.

In one method of use, a first subassembly is formed wherein the slide member 24, including the piston shaft 60, is positioned in the slide bore 44 of the support housing 22, the closure plate 26 is positioned about the piston shaft 60 and secured to the housing 22, and the quick-connect shaft 88 is connected to the piston shaft 60. The subassembly is fitted to the robot hand.

A second subassembly is formed including the spindle cartridge 32 being fitted into the socket 120 of the bearing shaft 30 and the bearing shaft 30 being fitted for sliding movement relative to the central passage 104 of the nose 28.

Figure 7:
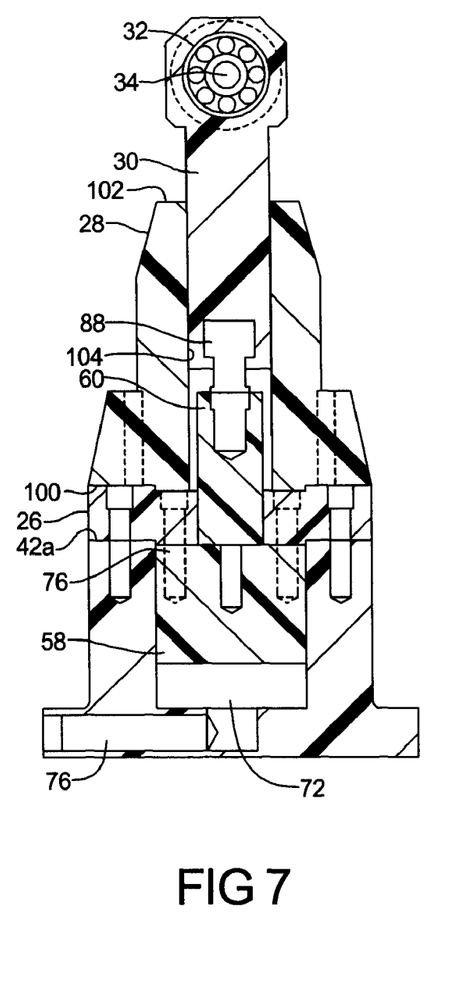
FIG. 7 is an elevation view in section of the hemming head taken along line 7-7 of FIG. 6.

The rearward end 100 of the nose 28 is positioned in off-centered relation with the forward end face 42a of the support housing 22 and lowered towards and onto the closure plate 26. The forward cylinder member 94 of the quick-connect shaft 88 is aligned and positioned with, and into, the U-shaped cavity 106 formed in the rearward end face 100 of the nose 28. The nose is then moved laterally to position the axis of the bearing shaft 30 into alignment with the axis "A." The forward cylinder member 94 of the quick-connect shaft 88 enters into the T-shaped cavity 112 formed in the open face 114 of the bearing shaft 30, interlocking the bearing shaft 30 and the quick-connect shaft 88, whereupon the bearing shaft is axially advanced to captivate the interconnection within the central passage 104 (see FIGS. 6 and 7).

The nose 28 is then secured to the closure plate 26 by threaded fasteners which extend through the bolt holes 108 of the nose 28 and into the threaded boltholes 54. The plunger (the piston and quick-connect shafts 60 and 88) and the bearing shaft 30 are thus interconnected for axially guided movement relative to the central passage 104 in the nose 28. The rollers 36 and 38 are then secured to the spindle shaft 34.

In the practice of this invention, the hemming apparatus 10 is placed in operable relation with fluid control apparatus, which maintains control of the chamber pressure. Further, this fluid control apparatus is preferably in synchronized operable control by the control system that directs the robotic arm to complete a hemming operation.

Preferably, the pressurizable fluid is air, although in some applications the fluid may by oil or other suitable liquid medium.

The fluid pressure supplied to the hemming apparatus 10 provides a cushion of fluid to maintain the hem roller in contact with the metal panels being hemmed and inhibit the piston 58 from unwanted axial movements either toward or away from the workpiece.

Desirably, in operation, should one or both of the hem rollers 36 and 38 need replacement, either for repair or to install a different roller having a different diameter for use in another hemming application, the rollers are easily removable and changed for the desired needs.

Further, the hemming apparatus 10 guides the bearing shaft 30 and spindle cartridge 32, thus obviating the need of the robot to change position to accomplish positioning of the roller and cartridge relative to the workpiece.

Although various embodiments of the invention have been disclosed for illustrative purposes, it is understood that one skilled in the art can make variations and modifications without departing from the spirit of the invention.

What is claimed is:

1. A roller-type hemming apparatus, comprising:
    a housing having rearward and forward ends and a pressurizable chamber, a slide member disposed within said chamber, said slide member having a piston and a plunger, said plunger projecting forwardly of said forward end of said housing and terminating in an interlockable first connector, said piston dividing said chamber into rearward and forward chamber portions, each of said chamber portions being connectible to a source of pressure for selectively pressurizing each said chamber portion so as to move said piston relative to said chamber;
    a nose having rearward and forward ends and a central guide passage extending between said ends of said nose, a bearing shaft mounted for sliding movement in said guide passage, said bearing shaft including rearward and forward ends that form an interlockable second connector;
    a head portion, said head portion connected to said first connector by said second connector;
    a spindle cartridge, said cartridge being removably mountable to said head portion and including a rotatably mounted spindle shaft having opposite ends;
    first means for releasably mounting said rearward end of said housing to a robot; and
    second means for releasably mounting said rearward end of said nose to said forward end of said housing.

2. The apparatus of claim 1 wherein said second means for releasably mounting includes a substantially circular disc-shaped closure plate, said closure plate having a cylindrical guide bore in the center thereof, a pair of opposed substantially planar faces, said rearward end of said nose being releasably mounted to said first closure plate face, and said forward end of said housing being releasably mounted to said second closure plate face.

3. The apparatus of claim 1 wherein said roller-type hemming apparatus comprises a hem roller mounted to each of said spindle shaft ends for rigid body rotation therewith, each of said hem rollers having a different diameter.

4. The apparatus of claim 1 wherein said plunger comprises:
   a piston shaft and a quick-connect shaft;
   said piston shaft being axially elongated and having rearward and forward end portions, said rearward end portion being externally threaded for threadable connection with said slide member, said forward end portion having a threaded socket; and
   said quick-connect shaft being substantially stepped, cylindrical, and having an externally threaded rearward end that is connectable to said threaded socket, a medial cylindrical neck portion having a reduced diameter, and interlockable first connector being substantially T-shaped in cross-section.

5. The apparatus of claim 1 wherein said interlockable first connector including a cylindrical neck portion and a cylindrical male section, said male section being greater in diameter than said cylindrical neck portion such that said interlockable first connector is generally T-shaped in cross-section;
   said rearward end of said bearing shaft being hollowed out to provide a generally cylindrical cavity being T-shaped in cross-section, said cavity being outwardly open on a first face of said bearing shaft and including an enlarged interior chamber and a chamber neck portion having a reduced diameter, said chamber neck portion forming an axial passage between said rearward end of said shaft and said interior chamber;
   said forward end of said bearing shaft being fixedly connected to said head portion;
   wherein said male portion of said interlockable first connector is greater in diameter than said chamber neck portion of said interior chamber such that said interlockable first connector is captivated by said interior chamber, thereby connecting said first connector with said head portion.

6. The apparatus of claim 1 wherein said roller-type hemming apparatus further comprises:
   a first pressure line provided in said housing, said first pressure line extending from said rearward chamber portion to an exterior wall of said housing such that said rearward chamber portion is in fluid communication with said source of pressure; and
   a second pressure line provided in said housing, said second pressure line extending from said forward chamber portion to an exterior wall of said housing such that said forward chamber portion is in fluid communication with said source of pressure.

7. A roller-type hemming apparatus, comprising:
   a support member having a slide bore and an interior chamber;
   a closure plate having a guide bore therethrough, said closure plate having a pair of opposed faces, said closure plate being mounted along a first of said opposed faces in sealing relation to said support member allowing said interior chamber to be pressurized;
   a slide member including a piston and an axially elongated plunger extending therefrom and terminating in a connectible end, said piston mounted in said interior chamber for axial slidable movement relative to said bore, and said plunger extending through said guide bore for axial slidable movement relative thereto, said plunger and said guide bore being fitted to form a close interface, said piston separating said interior chamber into forward and rearward chamber portions with each said chamber portion being adapted to be placed in fluid communication with a pressure source for selectively adjusting the pressurize in each of said chamber portions and the force applied against opposite sides of said piston wherein to move said piston and said connectible end of said plunger relative to said closure plate;
   means for sealing said interface between said plunger and said guide bore;
   a roller hemming assembly, said roller hemming assembly including at least one hem roller for engaging a workpiece; and
   means for connecting said roller hemming assembly to said plunger;
   wherein adjusting the pressure in said respective chamber portions causes said plunger to force said hem roller into engagement with said workpiece.

8. The apparatus of claim 7 wherein said plunger further comprises a two-part assembly comprised of a piston shaft and a quick-connect shaft, said assembly is coaxially disposed and extends outwardly from said forward side of said piston, said piston shaft and said quick-connect shaft being threadably connected to each other at their respective ends, said piston shaft including a rearward end connected to said piston, and said connectible end is formed by a forward end portion of said quick-connect shaft.

9. The apparatus of claim 7 wherein said spindle cartridge has a spindle shaft with opposite ends, said spindle shaft being rotatably mounted to said spindle cartridge, and at least one hem roller is rotatably secured to said spindle shaft.

10. The apparatus of claim 9 wherein said spindle shaft has opposed ends, each end having at least one of said hem rollers secured thereto, said hem rollers being different in diameter from each other.

11. The apparatus of claim 7 wherein said means for connecting said roller hemming assembly to said plunger further comprises an axial bearing shaft having forward and rearward end portions, said forward end portion including means for removably mounting said roller hemming assembly; and said rearward end portion of said bearing shaft and said connectible end of said plunger having complementary male and female portions which are adapted to interlock with one another wherein to connect said bearing shaft and said plunger together.

12. The apparatus of claim 11 wherein said roller-type hemming apparatus comprises a shaped nose having a rearward end face that is connected to a second of opposed faces of said closure plate, a forward end, and a central passage, said central passage extending between said rearward and forward ends to enclose said interconnected bearing shaft and said connectible end of said plunger; and said forward end portion of said bearing shaft extending outwardly of said nose and said roller hemming assembly being positioned forwardly of said nose.

13. The apparatus of claim 12 wherein said roller-type hemming apparatus further comprises said central passage and said bearing shaft being substantially square in cross-section and complementary to each other; said rearward end portion of said bearing shaft being hollowed out to provide a generally cylindrical cavity which is substantially T-shaped in cross-section and coaxially aligned with said bearing shaft; said rearward end face of said nose is formed to include a U-shaped cavity that extends transversely of said central passage; and said connectible end of said plunger having a substantially T-shaped cross-section.

14. A hemming apparatus for use with a robot in performing a hemming operation on a pair of metal panels, the hemming apparatus comprising:
- a support housing having a rearward base for mounting said housing to said robot, a forward closure plate having a central guide bore, and a pressurizable interior chamber;
- a slide member including a piston disposed in said chamber and a plunger extending from said piston and through said guide bore to a connectible end which is spaced from said closure plate;
- a nose removably secured to said closure plate;
- a bearing shaft having forward and rearward end portions;
- means for connecting said rearward end of said bearing shaft to said connectible end of said plunger;
- a spindle cartridge, said spindle cartridge including a spindle shaft having opposite ends and mounted for rotation relative to said spindle cartridge, a hem roller attached to each end of said spindle shaft ends for rotation therewith, and each of said hem rollers dimensioned for performing a different task as part of said hemming operation;
- means for connecting said spindle cartridge to said forward end portion of said bearing shaft; and
- said piston dividing said chamber into rearward and forward portions, said rearward and forward portions being connectible to a source of fluid pressure, whereby adjusting the pressure forces said piston to move either forwardly or rearwardly, causing said bearing shaft to drive said hem roller into engagement with a workpiece.

\* \* \* \* \*